United States Patent Office 3,422,335
Patented Jan. 14, 1969

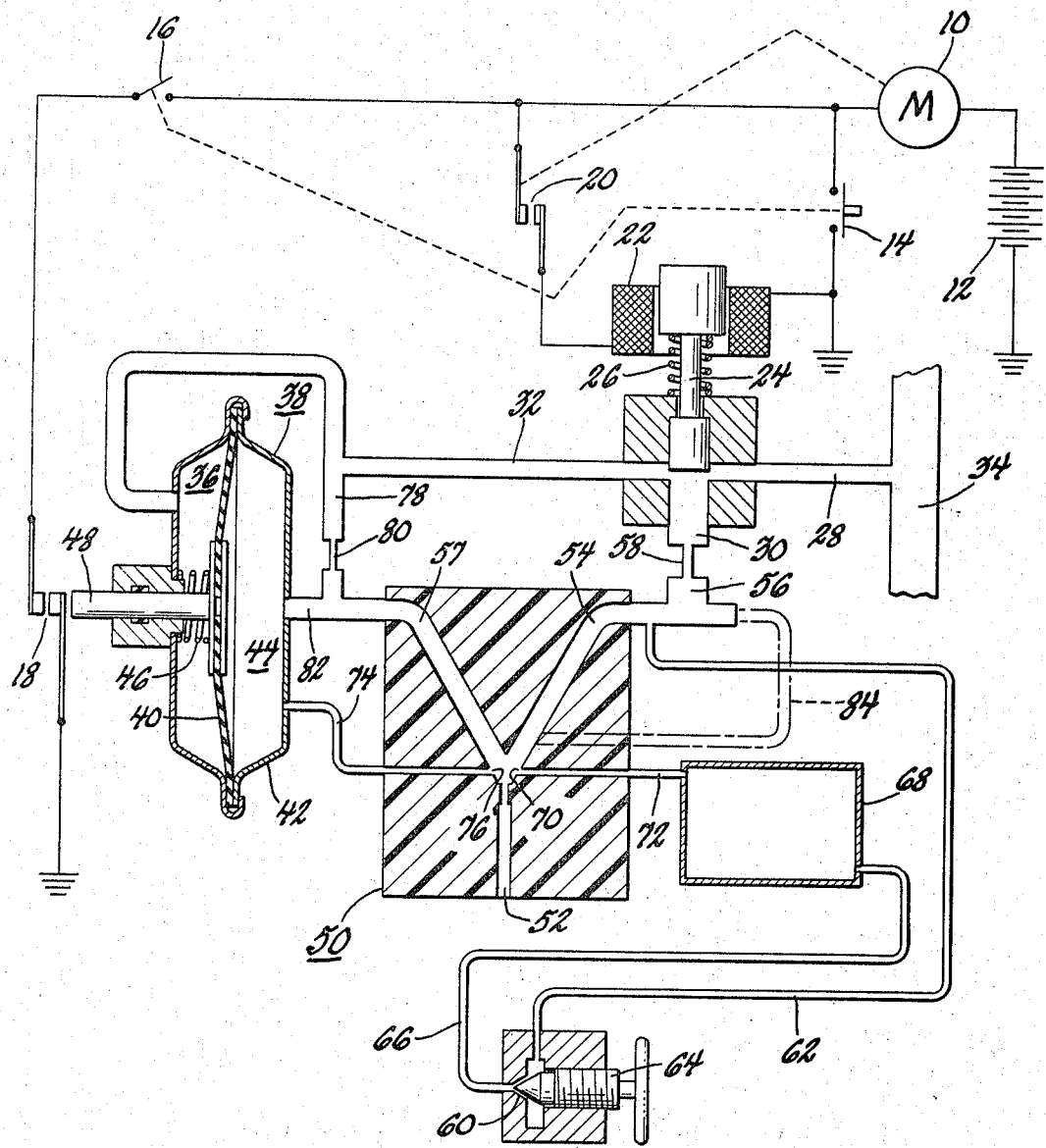

3,422,335
PULSE WIPER CONTROL
Keith H. Carpenter, Kettering, Ohio, and David L. Jones, Jr., Rochester, N.Y., assignors to General Motors Corporation, Detroit, Mich., a corporation of Delaware
Filed Dec. 27, 1965, Ser. No. 516,321
U.S. Cl. 318—443        9 Claims
Int. Cl. H02p 1/04; 5/00; 7/00

ABSTRACT OF THE DISCLOSURE

In a preferred form, this disclosure relates to pulse type windshield wiping system for wiping the windshield of a vehicle. The system includes an electric drive motor which is adapted to be intermittently energized for moving a windshield wiper across the windshield through one cycle of operation each time it is energized. The system further includes a switch means in an electric circuit with the motor for controlling energization and de-energization thereof, a fluid pressure responsive means for actuating and deactuating the switch means and a control means including a fluid amplifier for alternately directing a flow of fluid toward a vacuum source and the pressure responsive means at a predetermined cycling frequency whereby the switch means is intermittently actuated to intermittently energize the drive motor.

---

This invention relates to windshield wiping mechanisms and more particularly to a control for a pulse type wiper motor.

In pulse wiper motors of common design, a wiper blade is made to travel over a windshield to generate a wiping action thereon at a constant speed from a poised position. When the wiper has completed one cycle from the poised position back to the poised position, a delay is had before the next cycle begins. The length of the delay, of course, determines the cycling frequency and is most desirably controllable so that the frequency of the wiping action can be tailored to the type of and amount of matter deposited on the windshield.

It is an object of the present invention to provide an improved pulse wiper control which controls the frequency of the cycle of a pulse wiper utilizing a minimum number of moving parts.

It is another object of the present invention to provide an improved windshield wiper control mechanism which initiates a wiping cycle by a pulse communicated from a fluid amplifier and which spaces the driving pulses from the fluid amplifier by means of a capacitance storage device working with the fluid amplifier.

It is still another object of the present invention to provide an improved pulse wiper control in which the operation of the wiper is automatically regulated by a single control in the driving compartment of a vehicle.

Further objects and advantages of the present invention will be apparent from the following description, reference being had to the accompanying drawing wherein a preferred embodiment of the present invention is clearly shown.

In the drawing:

In the single figure drawing, the subject invention is diagrammatically illustrated.

In the drawing, an electric motor 10 receives power from a battery 12 to drive windshield wipers for a vehicle. Push button switch 14 is normally open but can be pressed momentarily during the closing of switch 16 to energize motor 10. Normally electrical circuitry is computed through switch 16 and contacts 18 to provide a normal path for current flow during the operation of motor 10. Motor 10 includes well-known cycling means such as camming devices which generate a force to open and close motor control switch 20 after and before one operating sweep of the windshield wipers across a windshield from a poised position back to the poised position.

A circuit is established through switch 20 to solenoid 22 which repositions valve means 24 against the bias of spring 26 to a position wherein fluid communication between line 28 and chamber 30 is interrupted but fluid communication between line 28 and line 32 remains uninterrupted.

Chamber 34 communicates with the intake manifold of an internal combustion engine and communicates a vacuum pressure thruogh lines 28 and 32 into chamber 36 of diaphragm operated switch, generally designated by numeral 38, sometimes referred to herein as first means. Diaphragm 40 suspended in housing 42 is normally biased toward chamber 44 by spring 46 but retained in the position shown in the drawing. Switch actuator 48 is carried by diaphragm 40 and slidable in housing 42 to selectively close contacts 18. Contacts 18 are normally biased toward the open position.

A fluid amplifier, generally designated by numeral 50, is sometimes referred to herein as control means. Passage 52 communicates with the atmosphere and communicates atmospheric air at atmospheric pressure toward fluid flow directing passages 54 and 57. Chamber 56 communicates with chamber 30 through orifice 58 and with variable orifice control 60 through line 62. Control 60 has a selectable inlet control 64 for varying the opening between line 62 and line 66. Selectable inlet control 64 is typically mounted in the driving compartment of a vehicle accessible to a vehicle operator for controlling the motor control apparatus in a manner to be hereinafter described. Line 66 establishes a path for fluid communication between control 60 and capacitance storage 68. Capacitance storage 68 communicates with area 70 formed as a portion of the wall of passage 54 through line 72. Line 74 provides a path for fluid communication between area 76 formed as a portion of the wall of passage 57 and chamber 44 of diaphragm operated switch 38. Line 78 including orifice 80 provides a controlled path for fluid communication between line 82 and line 32, line 82 connecting passage 57 and chamber 44.

In operation, the subject system is controlled by push button switch 14 placed at some convenient place in the driving compartment accessible to a vehicle operator and also the selectable inlet control.

When it is desired to operate windshield wiper motor 10, switch 16 is closed and push button switch 14 is momentarily closed to begin the operating cycle. As motor 10 begins rotation, appropriate camming means connected to the output shaft thereof causes the motor control switch 20 to close energizing solenoid 22. Solenoid 22 drives valve means 24 into chamber 30 against the bias of spring 26. Vacuum pressure is normally communicated from chamber 34 to line 32 and to chamber 30. The shifting of valve means 24 results in the blocking of vacuum pressure from chamber 30 with the sole path remaining for pressure communication being through line 32. It is assumed for purposes of this explanation that, while chamber 30 communicates with line 28, the flow of atmospheric air through fluid amplifier 50 results in an air flow through passage 54 into chamber 56. Therefore, the negative pressure in chamber 34 draws the atmospheric air from passage 52.

Keeping within the normal operating concepts of fluid amplifiers, an interruption in the path for fluid communication through passage 54 results in a shifting of the air flow into passage 57 due to negative pressure therein. Atmospheric pressure will then build up in chamber 44 and will assist the negative pressure present in chamber 36 to move diaphragm 40 against the bias of spring 46. This results in switch actuator 48 following the movement of diaphragm 40 and closing contacts 18.

A path for current flow then exists between motor 10 and ground through switch 16 and closed contacts 18. It is understood that the aforementioned portion of the cycle takes place very rapidly and during the energization of push button switch 14 which then is released. Power to the motor is maintained as long as contacts 18 are closed.

Motor 10 remains energized as long as positive pressure exists in chamber 44 and the flow will be maintained in passage 57 to positively pressurize chamber 44 as long as solenoid 22 remains energized. When motor 10 moves an amount sufficient to drive the windshield wipers through one cycle, the motor control switch 20 will be opened by any well-known means, such as the cam means previously mentioned. Solenoid 22 is thereby deenergized resulting in a shifting of valve means 24 to the position shown in the drawing. Line 74 pressurized with chamber 44 would normally have caused a shifting of the fluid flow from passage 57 to 54 previously but for the lack of a path for fluid communication from chamber 56 to line 28. Line 74 communicates with wall attachment area 76 which is the normal low pressure area when fluid flow exists through passage 57.

When a path for fluid flow again exists between chamber 56 and line 28 due to the repositioning of valve means 24, flow through passage 52 shifts back to passage 54 from passage 57. Fluid flow will continue through passage 54 until capacitance storage 68 is sufficiently pressurized to communicate a positive pressure to area 70 which is the normal low pressure area in passage 54 during fluid flow therethrough. It is understood that the time interval between cycling of the wipers is controlled by the length of time it takes to build up pressure in capacitance storage 68 which results in a shifting of the flow from passage 54 to passage 57. In turn, the length of time it takes to pressurize capacitance storage 68 is determined by the flow through lines 62 and 66 as predetermined by the positioning of selectable inlet control 64. It therefore becomes clear that the speed of the wiper sweep across the windshield is controlled directly by the speed of motor 10 and the frequency of cycling of motor 10 is determined by the amount of bleed through variable orifice control 60.

When sufficient pressure has built up in storage 68 to pressurize line 72 into area 70, flow shifts from passage 54 to 57 and chamber 44 is again pressurized. As previously described, pressurization of chamber 44 results in a shifting of diaphragm 40 and switch actuator 48 closing contacts 18. With the closing of contacts 18, motor 10 is again energized resulting in another sweep of the wipers across the windshield. The cycle then will repeat itself and will continue to recycle at a rate established by the setting of selectable inlet control 64.

The cycling of the subject apparatus is stopped by merely opening switch 16. It should be understood that switch 14 and switch 16 are tied together so that, as switch 16 is turned to the ON position, switch 14 is momentarily closed to impart a slight bit of rotation to motor 10 sufficient to mechanically close motor control switch 20. Switch 14 immediately opens due to the cycling of the subject device in response to the closing of solenoid 22 which results in a completion of a path for current flow for motor 10 through contacts 18. A change in the cycling frequency can easily be effected by a variation of selectable inlet control 64 mounted in the driving compartment. This may be desirable when a cyling frequency change is appropriate due to a change in the quantity of material deposited on the windshield of the vehicle. Under normal circumstances, the cycling frequency will remain the same as the last time the apparatus was energized and changes can very easily be made as desired during subsequent operation of the wipers.

The utility of the subject device is enhanced by the fact that there are no moving parts in the system for controlling the motor except the diaphragm which is in a sealed container and the electrical switches and solenoids. The reliability of these sealed units is very high and the pulsing of the wiper mechanism is accomplished without the necessity for mechanical contrivances. Another feature lending to the utility of the device is the incorporation of a feedback circuit 84 illustrated by the dotted lines on the drawing going from chamber 56 to area 70. The incorporation of this feedback line may be necessitated by the fact that, in certain installations, a shift in the flow from passage 54 to passage 57 does not necessarily occur. With feedback circuit 84 installed, a positive pressure is fed to area 70 while valve means 24 blocks orifice 58 in chamber 30. Positive pressure can exist in chamber 56 and, when bled to the area 70, the area of probable attachment, guarantees a shifting in the flow to passage 57 as desired for the operation of the subject system.

While the embodiment of the present invention, as herein disclosed, constitutes a preferred form, it is to be understood that other forms might be adopted.

What is claimed is as follows:

1. A motor control apparatus for intermittently energizing an electric motor comprising: switch means in an operative electric circuit with the drive motor for controlling energization and de-energization of the drive motor; fluid pressure responsive means for actuating and de-actuating said switch means to energize and de-energize said drive motor, respectively; a vacuum source; and control means including a fluid amplifier means for alternately directly a flow of fluid toward said vacuum source and said pressure responsive means at a predetermined cycling frequency, said pressure responsive means when said fluid is directed theretoward effecting actuation of said switch means to energize said drive motor.

2. A motor control apparatus as defined in claim 1 wherein said drive motor is drivingly connected with a windshield wiper mechanism for wiping the windshield of an automotive vehicle.

3. A motor control apparatus as defined in claim 1 and wherein said control means includes adjustable means for varying the cycling frequency of said fluid amplifier and hence the time interval between successive energizations of said drive motor.

4. Motor control apparatus for providing a pressure pulse to operate a windshield wiper through a single cycle, said apparatus comprising: an electric motor for operating windshield wipers; an electrical power source adapted to selectively drive said motor; a vacuum pressure source; switching means including first means responsive to a predetermined rate of flow of atmospheric air generated by a force from said vacuum pressure source, and control means including directing means for selectively routing the flow of atmospheric air to said first means, said control means including valve means operated by said electrical power source to selectively cut off fluid communication between said vacuum pressure source and said directing means whereby said first means is actuated and a circuit to said electric motor is energized.

5. Motor control apparatus according to claim 4 wherein said electric motor includes cycling means for automatically deenergizing itself when travel of the windshield wipers completes one cycle.

6. Motor control apparatus according to claim 4 wherein said directing means is a fluid amplifier having a capacitance storage with a selectable inlet control for controlling the rate of recycling of the pulse to said first means.

7. Motor control apparatus for providing a pulse to initiate an operating cycle of windshield wipers and the frequency of cycling, said motor control apparatus comprising: an electric motor for driving windshield wipers; electrical power source means adapted to selectively energize said electric motor; a vacuum pressure source; switching means including first means responsive to a flow of atmospheric air generated by said vacuum pressure source to complete a path for electrical current flow from said electric motor to said electrical power source means, said switching means including second means having solenoid means and third means for completing a path for electrical current from said electrical power source to said electric motor and for operating said solenoid means; and control means including an atmospheric pressure flow director and valve means responsive to movement of the solenoid means to shift a flow of atmospheric air in said atmosphere pressure flow director toward said first means thereby providing a path for current flow during operation of said electric motor separate from the path provided by said third means, said electric motor having means for opening and closing a circuit for operation of said solenoid means thereby timing the duration of an operating cycle of the windshield wipers.

8. Motor control apparatus according to claim 7 wherein said atmospheric pressure flow director includes a fluid capacitor with a controllable entry orifice for determining the rate of cycling frequency of said motor control apparatus.

9. Motor control apparatus according to claim 7 wherein said first means is a diaphragm operated switch normally biasedly balanced against a vacuum pressure force to an open position, the balance being upset by the influx of atmospheric air to one side of said diaphragm provided by a shifting of said atmospheric pressure flow director, the length of time that the atmospheric air acts on one side of said diaphragm being equal to the speed of travel of the windshield wipers through one cycle.

References Cited
UNITED STATES PATENTS 3,019,380    1/1962    Houser _____ 318—443 XR
3,110,056   11/1963    Oishei et al. _____ 318—443 XR ORIS L. RADER, *Primary Examiner.*

G. SIMMONS, *Assistant Examiner.*

U.S. Cl. X.R.

318—444, 486